US 6,561,561 B2
May 13, 2003

(12) United States Patent
Getzschman et al.

(10) Patent No.: US 6,561,561 B2
(45) Date of Patent: May 13, 2003

(54) STORAGE SYSTEMS FOR PICKUP TRUCKS AND OTHER VEHICLES (75) Inventors: Dan R. Getzschman, Eastman, GA (US); Tommy D. Rogers, McRae, GA (US); Nellie Blankenship, Milan, GA (US); Dwayne Oxford, Eastman, GA (US); Eric D. Getzschman, Eastman, GA (US)

(73) Assignee: Bestop, Inc., Broomfield, CO (US)

( * ) Notice: Subject to any disclaimer, the term of this patent is extended or adjusted under 35 U.S.C. 154(b) by 0 days.

(21) Appl. No.: 10/212,502

(22) Filed: Aug. 5, 2002

(65) Prior Publication Data

US 2002/0190536 A1 Dec. 19, 2002

Related U.S. Application Data (62) Division of application No. 09/834,378, filed on Apr. 13, 2001, now Pat. No. 6,435,586.
(60) Provisional application No. 60/197,653, filed on Apr. 17, 2000, and provisional application No. 60/201,172, filed on May 1, 2000.

(51) Int. Cl.⁷ ................................................. B60N 3/12
(52) U.S. Cl. ....................... 296/37.6; 296/37.5; 224/404
(58) Field of Search ............................... 296/37.6, 37.1, 296/57.1, 180.1, 26.11, 37.5, 39.2; 224/404, 543, 542, 497

(56) References Cited

U.S. PATENT DOCUMENTS

| 3,722,946 | A |   | 3/1973  | Cary |
| 4,451,075 | A | * | 5/1984  | Canfield ..................... 296/37.6 |
| 4,540,213 | A | * | 9/1985  | Herlitz et al. .............. 296/37.5 |
| 4,705,317 | A |   | 11/1987 | Henri |
| 4,749,226 | A | * | 6/1988  | Heft ........................ 296/37.6 |
| 4,828,312 | A | * | 5/1989  | Kinkel et al. ............... 296/37.6 |
| 4,938,519 | A | * | 7/1990  | Schlachter .................. 296/37.6 |
| 5,025,964 | A | * | 6/1991  | Phirippidis ................. 296/37.1 |
| 5,083,829 | A | * | 1/1992  | Fonseca ..................... 296/37.6 |
| 5,088,636 | A |   | 2/1992  | Barajas |
| 5,094,375 | A | * | 3/1992  | Wright ....................... 224/404 |
| 5,186,510 | A | * | 2/1993  | Stapp ........................ 296/37.6 |
| 5,207,469 | A | * | 5/1993  | Rossi ........................ 296/37.6 |
| 5,207,470 | A |   | 5/1993  | Rafi-Zadeh |
| 5,228,736 | A |   | 7/1993  | Dutton |
| 5,261,719 | A |   | 11/1993 | Tucker |
| 5,263,761 | A |   | 11/1993 | Hathaway et al. |
| 5,324,089 | A | * | 6/1994  | Schlachter .................. 296/37.6 |
| 5,366,124 | A | * | 11/1994 | Dearborn .................... 296/37.6 |
| 5,368,354 | A |   | 11/1994 | Martin |
| 5,469,999 | A | * | 11/1995 | Phirippidis ................. 224/542 |
| 5,480,206 | A |   | 1/1996  | Hathaway et al. |
| 5,487,585 | A | * | 1/1996  | Wheatley ................... 296/100.18 |
| 5,518,158 | A |   | 5/1996  | Matlack |
| 5,526,972 | A | * | 6/1996  | Frazier et al. ............... 224/402 |
| 5,564,768 | A |   | 10/1996 | Saffold |

(List continued on next page.)

Primary Examiner—Kiran Patel
(74) Attorney, Agent, or Firm—W. Scott Carson (57) ABSTRACT A storage system for a pickup truck or similar vehicle including a bow and storage compartment that has two panels. The bow is mounted between the side walls of the vehicle to extend over the bed of the vehicle. A first of the two panels of the storage compartment is supported on the bow and depends substantially vertically downwardly. The second panel is attached to the first panel and extends rearwardly over the bed toward the tailgate. In use, loose items such as grocery bags can be placed on the second panel of the storage compartment and with the tailgate closed, the items will be held securely and safely in place between the first panel of the storage compartment and the closed tailgate. Tracks or channels can also be provided in rails on the side walls of the vehicle to receive and secure storage containers for the loose items.

12 Claims, 9 Drawing Sheets

U.S. PATENT DOCUMENTS

| | | | |
|---|---|---|---|
| 5,564,776 A | | 10/1996 | Schlachter |
| 5,570,921 A | * | 11/1996 | Brooker ..................... 296/37.5 |
| 5,620,124 A | | 4/1997 | Geier |
| 5,628,442 A | * | 5/1997 | Wayne ....................... 224/543 |
| 5,853,116 A | * | 12/1998 | Schreiner ................... 296/37.6 |
| 5,893,597 A | * | 4/1999 | Rider ........................ 296/37.6 |
| 5,992,719 A | * | 11/1999 | Carter, III ................... 296/37.6 |
| 6,024,402 A | | 2/2000 | Wheatley |
| 6,065,794 A | * | 5/2000 | Schlachter ................. 296/37.6 |
| 6,070,775 A | * | 6/2000 | Tolley et al. ................ 224/404 |
| 6,073,985 A | * | 6/2000 | Keip ......................... 296/37.6 |
| 6,082,804 A | | 7/2000 | Schlachter |
| 6,092,852 A | | 7/2000 | Lawrence |
| 6,109,847 A | | 8/2000 | Patel et al. |
| 6,138,883 A | * | 10/2000 | Jackson et al. ............. 296/37.6 |
| 6,149,040 A | * | 11/2000 | Walker ....................... 224/404 |
| 6,170,724 B1 | * | 1/2001 | Carter et al. ................ 296/37.6 |
| 6,174,012 B1 | * | 1/2001 | Saffold ....................... 296/37.6 |
| 6,257,640 B1 | * | 7/2001 | Leitner et al. .............. 296/37.6 |
| 6,349,865 B1 | * | 2/2002 | Tolley et al. ................ 296/37.6 |
| 6,435,586 B2 | * | 8/2002 | Getzschman et al. ....... 296/37.6 |
| 6,471,278 B2 | * | 10/2002 | Leitner et al. .............. 296/37.6 |
| 2002/0101088 A1 | * | 8/2002 | Rigau ......................... 296/37.6 |
| 2002/0153737 A1 | * | 10/2002 | Fitts .......................... 296/37.6 |
| 2002/0175530 A1 | * | 11/2002 | Lake ......................... 296/37.6 |

* cited by examiner

STORAGE SYSTEMS FOR PICKUP TRUCKS AND OTHER VEHICLES

RELATED PATENT APPLICATIONS

This application is a division of U.S. patent application Ser. No. 9/834,378 filed Apr. 13, 2001 now U.S. Pat. No. 6,435,586 and claims the benefit of U.S. Provisional Patent Application Serial No. 60/197,653 filed Apr. 17, 2000 and U.S. Provisional Patent Application Serial No. 60/201,172 filed May 1, 2000, both now abandoned.

BACKGROUND OF THE INVENTION

1. Field of the Invention

This invention relates to the field of storage systems for pickup trucks and other vehicles.

2. Discussion of the Background

Pickup trucks and vehicles such as sport utility ones are very popular and can be used to transport not only passengers but also significant amounts of cargo. However, when such cargo is loose or includes relatively small items such as grocery bags, a problem can develop in that the items are not secured in place. Consequently, they can slide around and tip over for example in the pickup box, particularly when the driver makes sharp turns or brakes. This can cause damage not only to the items but also to the box of the pickup truck itself. Such loose items if small enough can be transported in the cabin of the truck but this takes up valuable passenger space. Rigid tool or storage boxes can be provided in and across the pickup bed (typically directly behind the cabin) for the loose items. However, such tool boxes are fairly difficult to access from the sides of the truck, take up storage space if not completely filled, and are not easily removable if it is desired to use the full area of the pickup truck bed.

With the above mind, the storage systems of the present invention were developed. In one system, a storage compartment is provided immediately forward of the tailgate of the vehicle to securely hold the transported items in place. The storage compartment can be supported on its own bow extending between the side walls of the vehicle or can be integrated into a tonneau or other cover. In another system, tracks or channels are provided in rails on the side walls of the vehicle to receive and securely hold storage containers in which the loose items can be placed during transport. The rails can also be integrated into the retaining arrangement for a tonneau or other cover.

SUMMARY OF THE INVENTION

This invention involves storage systems for pickup trucks and similar vehicles. One system includes a bow and storage compartment that has two panels. The bow is mounted between the side walls of the vehicle to extend over the bed of the vehicle. A first of the two panels of the storage compartment is supported on the bow and depends substantially vertically downwardly from it to the bed. The second panel is attached to the first panel and extends rearwardly over the bed toward the tailgate. In use, loose items such as grocery bags can be placed on the second panel of the storage compartment and with the tailgate closed, the items will be held securely and safely in place between the first panel of the storage compartment and the closed tailgate. In another system, the storage compartment is integrated into a tonneau cover and in an additional system, tracks or channels are provided in rails on the side walls of the vehicle to receive and secure storage containers for the loose items.

BRIEF DESCRIPTION OF THE DRAWINGS

FIG. 15 is a cross sectional view showing how the tonneau cover can be mounted on the side wall rails. FIG. 15 also shows a storage system including channels or tracks in each rail on the side walls for receiving and securing storage containers.

DETAILED DESCRIPTION OF THE PREFERRED EMBODIMENTS

Figure 1:
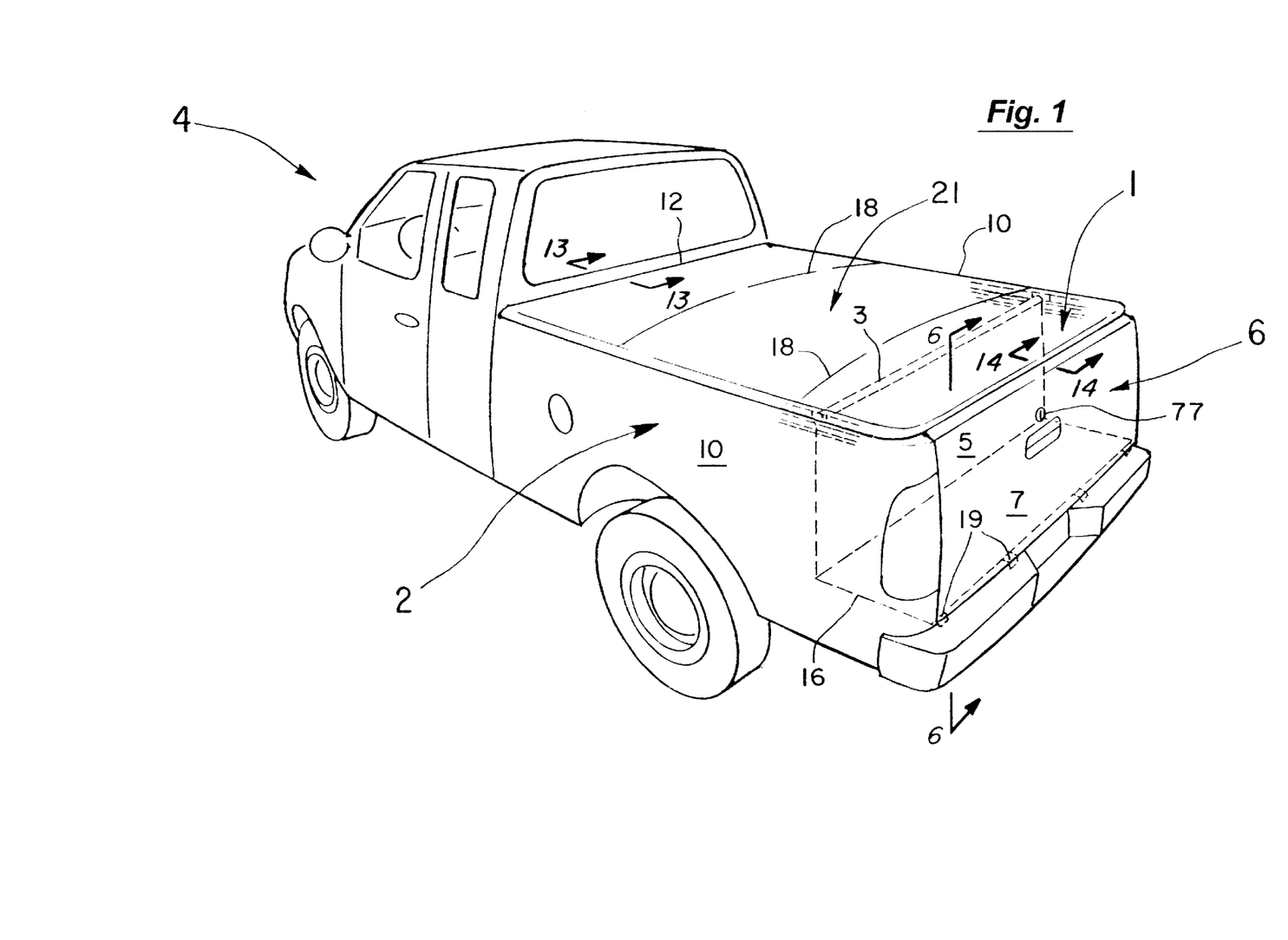
FIG. 1 is a perspective view of a vehicle with one of the storage systems of the present invention.
Figure 2:
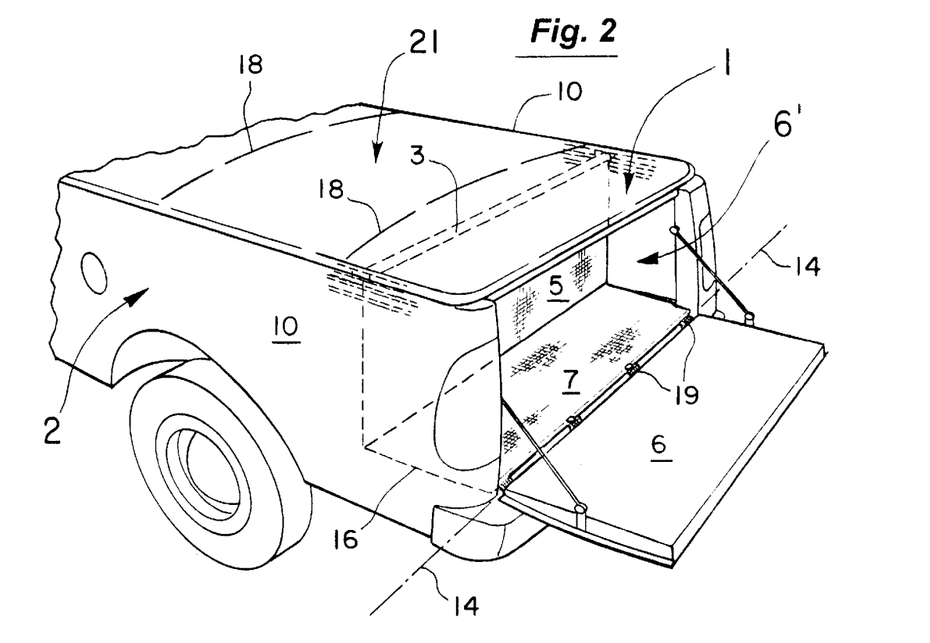
FIG. 2 is a view of the vehicle of the FIG. 1 with the tailgate open to provide rear access to the storage compartment without having to remove the tonneau cover.
Figure 3:
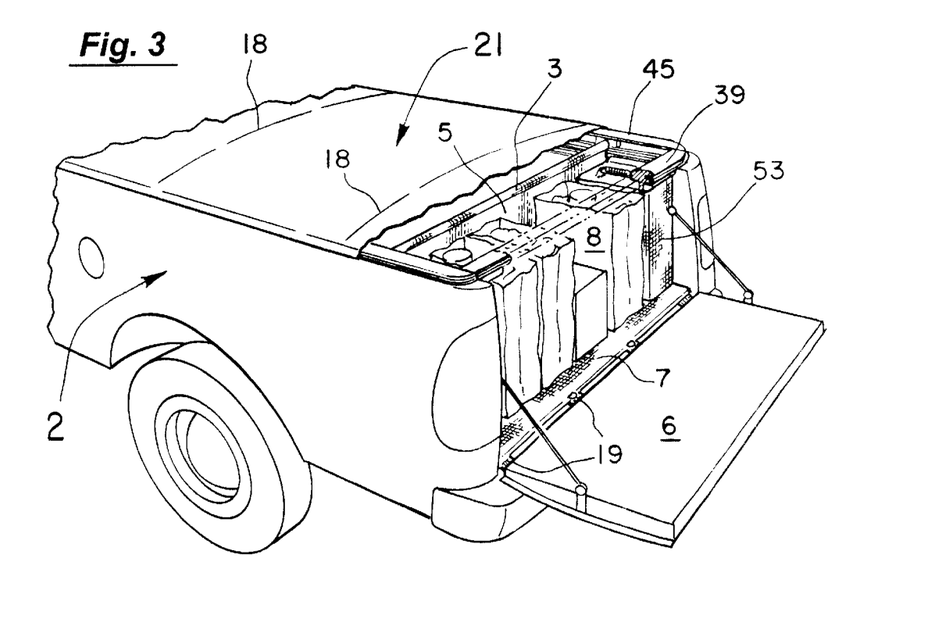
FIG. 3 is a view similar to FIG. 2 showing the storage compartment of the present invention in use to receive loose items such as grocery bags.

As illustrated in FIGS. 1–3, the preferred storage system of the present invention provides a convenient storage compartment 1 at the rear of the box 2 of the vehicle 4 that can be easily and quickly accessed by opening the vehicle's tailgate 6 (FIGS. 2–3). Smaller items such as the grocery bags 8 in FIG. 3 can then be placed in the compartment 1 and with the tailgate 6 closed as in FIG. 1, the items will be held safely and securely in place as the vehicle 4 is driven. The vehicle 4 as shown for illustrative purposes is a pickup truck with a box 2 formed by two, spaced-apart side walls 10, front wall 12, and tailgate 6 in the closed position of FIG. 1. The tailgate 6 as shown is mounted for movement about a horizontal axis 14 (see FIG. 2) but could be pivotally mounted for movement about a vertical axis. Additionally, the pickup truck 4 could be any similar vehicle such as a sport utility one whose liftgate operates as a tailgate and whose cargo area is enclosed or covered by the vehicle body itself or a separate privacy cover.

The preferred storage system of FIGS. 1–3 includes a bow 3 mounted to the side walls 10 of the vehicle 4. The bow 3 extends between the side walls 10 and above the floor or bed 16 of the vehicle 4. The preferred storage system also includes the storage compartment 1 which has first and second panels 5 and 7 made of flexible, foldable material such as fabric, canvas, or vinyl. The first panel 5 (see FIGS. 1 and 2) is supported on the bow 3 to preferably extend substantially between the side walls 10. The panel 5 also depends substantially vertically downwardly from the bow 3 to a first location adjacent the vehicle bed 16. This location as illustrated in FIG. 1 is forward of the closed tailgate 6. The second, flexible panel 7 is attached to the first panel 5 and extends rearwardly as shown over the bed 16 toward the tailgate 6.

In operation, items to be stored and transported can be easily and quickly placed on the second panel 7 through the tailgate opening 6' in FIGS. 2 and 3. With the tailgate 6 then closed as in FIG. 1, the items can be safely and securely held in place between the first panel 5 of the storage compartment 1 and the closed tailgate 6.

Figure 4:
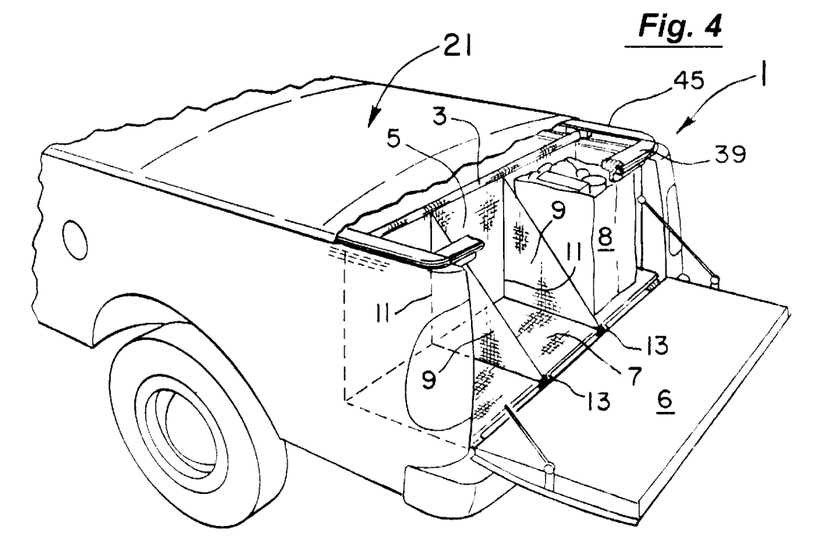
FIG. 4 illustrates a feature of the present invention in which divider sections are provided to form subcompartments for holding and retaining items.
Figure 5:
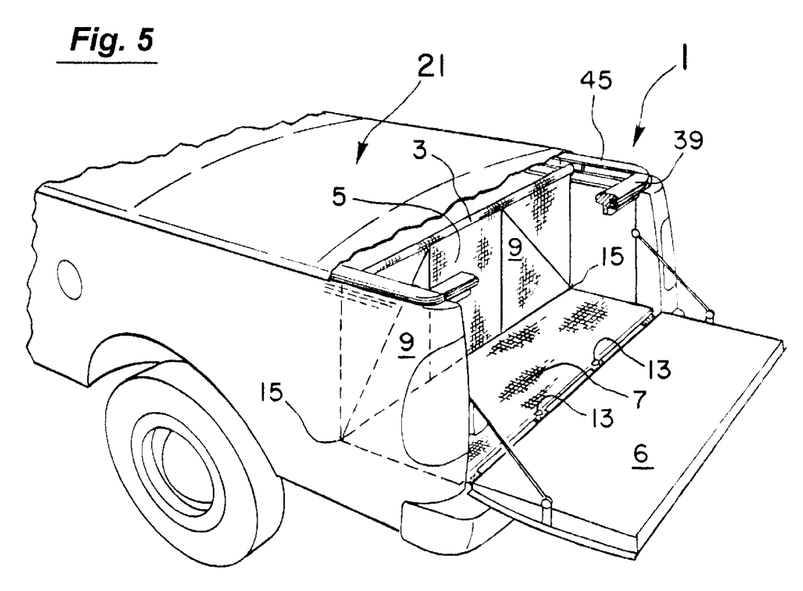
FIG. 5 illustrates the divider sections of FIG. 4 in their retracted positions flush against the vertical panel of the storage compartment.

For smaller loads or to more securely hold the individual items in place, the storage compartment 1 as illustrated in FIG. 4 can be provided with one or more divider sections 9. The divider sections 9 are preferably made of flexible, foldable material and are shown as being triangular but could be of any desired shape. The divider sections 9 are preferably attached to the first panel 5 along the back edge or leg 11 and held in place on the second panel 7 at 13 (e.g., by a clip and D-ring pair, loop and hook fastener, or similar arrangement). In use, the divider sections 9 can be positioned as shown in FIG. 4 to create smaller, subcompartments on either side. When not needed, the divider sections 9 can be easily and quickly disconnected at 13 from the second panel 7 and moved to positions flush against the first panel 5 as in FIG. 5. The divider sections 9 can then be secured in these flush positions by attachments at 15 in manners similar to the attachments at 13.

The second panel 7 of the storage compartment 1 can be secured in place over the rear of the vehicle bed 16 in any number of manners. In the preferred embodiment, strips 19 of material (see FIGS. 1–3) are attached to the second panel 7 and extend rearwardly therefrom. In operation, the strips 19 are positioned between the tailgate 6 and the vehicle bed 16 to be pinched therebetween when the tailgate 6 is closed. This aids in positively anchoring the panels 5 and 7 of the storage compartment 1 in place.

The storage compartment 1 of FIGS. 1–5 is preferably not attached to the tonneau cover 21. Rather, the storage compartment 1 is independently supported by the bow 3 which extends substantially horizontally between the side walls 10. In this manner as explained in more detail below, the tonneau cover 21 is separately and independently mountable to extend over the entire bed 16 of the vehicle 4 including over the storage compartment 1. In one mode of operation with the tonneau cover 21 remaining in place as illustrated in FIGS. 1–3, the tailgate 6 can be opened (FIGS. 2–3) to provide rear access to the storage compartment 1 through the tailgate opening 6 between the side walls 10. As shown, this can be done without having to remove or otherwise manipulate the tonneau cover 21. Further, as is evident, the storage compartment 1 can also be used if the tonneau cover 21 is removed or rolled forward. Direct access to the storage compartment 1 can then be obtained from above without having to open the tailgate 6.

Figure 6:
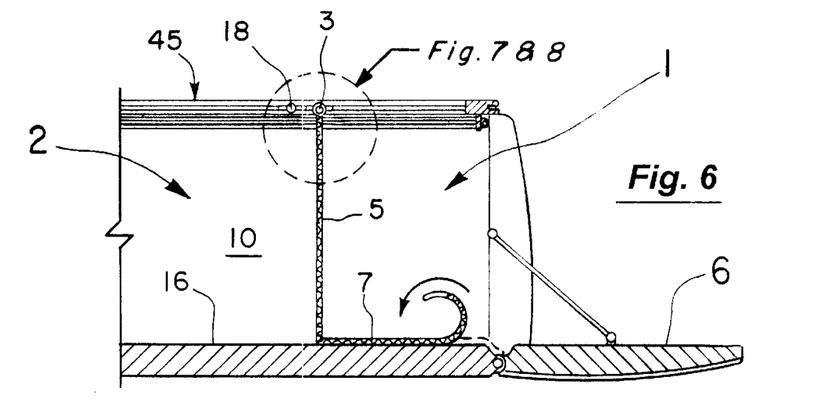
FIG. 6 is a view of the panels of the storage compartment taken generally along line 6—6 of FIG. 1.
Figure 7:
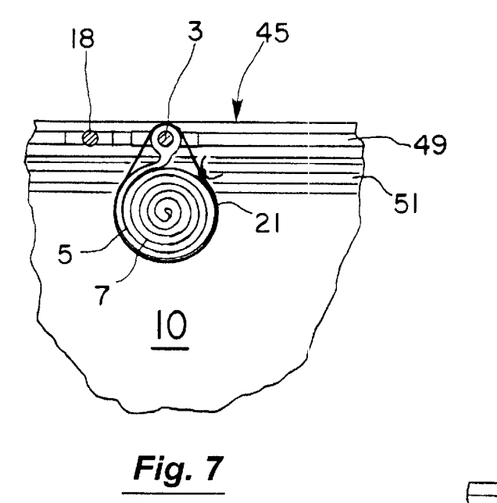
FIG. 7 illustrates one manner in which the flexible panels of the storage compartment can be rolled up on themselves and secured adjacent the support bow.
Figure 8:
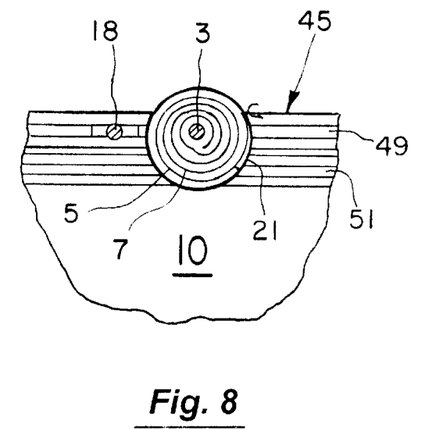
FIG. 8 illustrates another manner in which the flexible panels of the storage compartment can be rolled up about the bow and secured in place.
Figure 9:
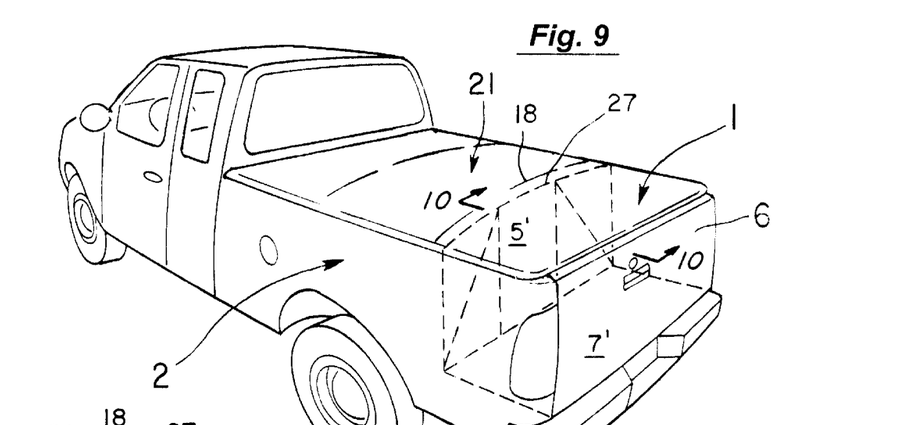
FIG. 9 is a perspective view of an embodiment in which the storage compartment is integrally attached to a soft tonneau cover.

Referring to FIGS. 6–8 and when it is desirable to have the flexible panels 5 and 7 of the storage compartment 1 out of the way, the panels 5 and 7 can be rolled up on themselves in the manner of FIG. 7 and secured by ties 21 adjacent or against the bow 3. The panels 5 and 7 could also be rolled up around the bow 3 as in FIG. 8 and secured by ties 21. Either way, the rolled up panels 5 and 7 and bow 3 can then be left in place or as explained in more detail below, the bow 3 with panels 5 and 7 secured thereto can be easily and quickly removed as a unit from between the side walls 10 and placed in the box 2 of the vehicle 4 or otherwise stored remotely.

Figure 10:
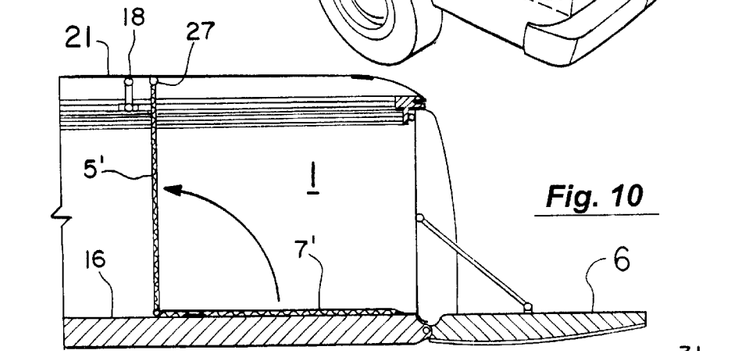
FIGS. 10–12 illustrate a manner in which the panels of the storage compartment of FIG. 9 can be folded on themselves and secured to the underside of the soft tonneau cover in an out of the way position.
Figure 11:
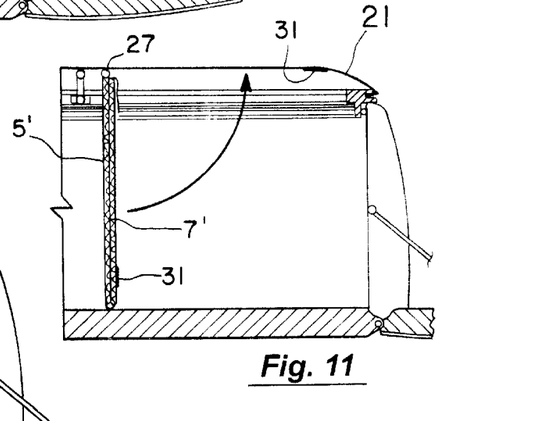
Figure 12:
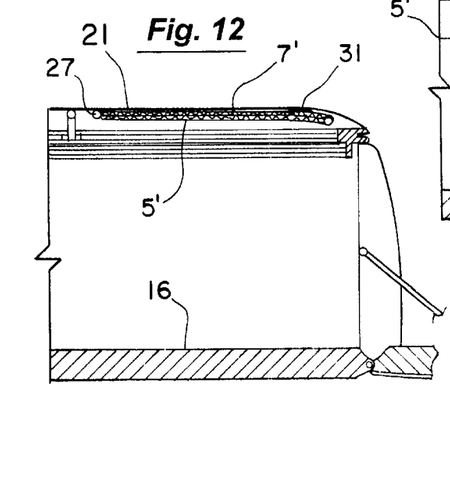

As indicated above, the storage compartment 1 is preferably separate and independent of the tonneau cover 21. However, as illustrated in FIGS. 9–12, the storage compartment 1' could be physically integrated or attached to the soft tonneau cover 21. As shown in FIG. 10, the first panel 5' of the storage compartment 1' in this embodiment is attached to the underside of the tonneau cover 21 at 27. A bow is not necessarily needed for the attachment of the panel 5' at 27; however, both the tonneau cover 21 and the panel 51 could be attached to a bow and each other at 27 if desired. In use, the panels 5' and 7' are positioned as shown in FIG. 10 to form the storage compartment 1'. When not in use or when desired, the flexible panels 5' and 7' can be rolled up against or adjacent the underside of the tonneau cover 21 as in FIG. 7 and held in place by ties depending from the tonneau cover 21. The panels 51 and 7' could also be rolled or folded up out of the way as illustrated in FIGS. 10–12. In the out of the way position of FIG. 12, the panel 7' is attached at 31 to the underside of the tonneau cover 21 (e.g., by hook and loop fastener, snaps, or the like).

Figure 13:
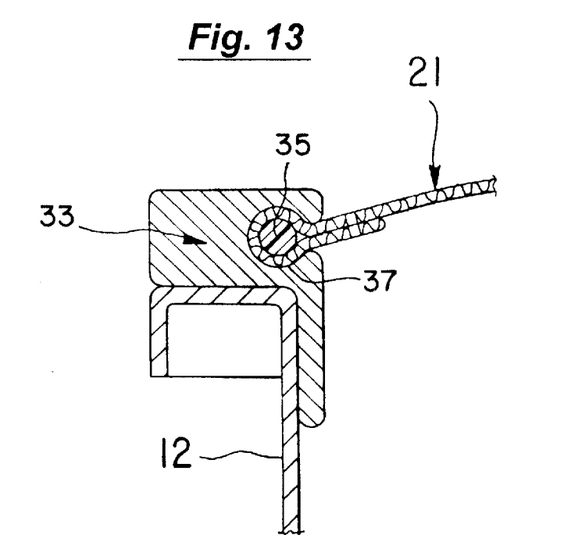
FIG. 13 is a view taken along line 13—13 of FIG. 1 illustrating how the tonneau cover can be mounted on the front wall of the vehicle box.
Figure 14:
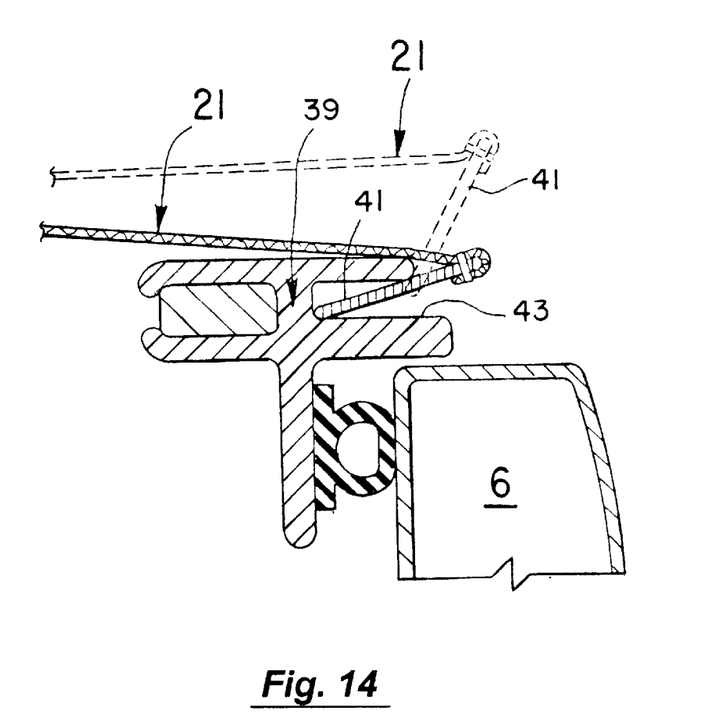
FIG. 14 is a view taken along line 14—14 of FIG. 1 showing how the tonneau cover can be mounted on a rail suspended adjacent the tailgate.

In FIGS. 1–12, the soft tonneau cover 21 of the preferred embodiments is removably mounted to extend over the entire bed 16 of the vehicle from the front wall 12 to the tailgate 6 and between the side walls 10. The walls 10 and 12 extend upwardly from the bed 16 as shown and as indicated above, the walls 10 and 12 together with the closed tailgate 6 form the box 2. The tonneau cover 21 can be removably mounted over the box 2 and bed 16 in any number of manners. For example, as illustrated in FIG. 13, the front of the tonneau cover 21 can be attached to the rail 33 on the front wall 12 of the box 2 by a P-welt or arrangement of a dowel 35 and C-shaped channel 37. For attachment to the rear rail 39 which is suspended between the side walls 10 at the tailgate 6 (see FIGS. 3 and 14), a substantially rigid belt 41 is preferably secured (e.g., sewn) to the rear edge of the tonneau cover 21. The belt 41 in FIG. 14 is then removably receivable in the groove 43 in the rail 39. Preferably, the tonneau cover 21 is removably attached in a similar manner to the rails 45 (see FIG. 15) on the tops of the side walls 10. Other attachments such as snaps or hook and loop fasteners could be used as well.

The soft tonneau cover 21 is preferably made of a single, continuous sheet or piece of flexible, foldable material (e.g., fabric, canvas, or vinyl) that is slightly elastic and stretchable. Consequently, in use as illustrated in FIG. 14, the tip portion of the belt 41 can be inserted into the mouth of the groove 43 by initially stretching the slightly elastic cover 21 to place the belt 41 in the dotted position of FIG. 14. The belt 41 can then be manually rotated or pivoted using the upper edge of the groove 43 as a fulcrum to gain leverage. This will further stretch and tension the cover 21 wherein the cover 21 will thereafter essentially draw the belt 41 into the groove 43 to the position shown in solid lines in FIG. 14. The belt 41 will thus be firmly held in place under the residual tension in the stretched, resilient cover 21. The rails 33, 39, and 45 if desired could be molded directly into the respective walls 10 and 12 and the top of the tailgate 6.

Figure 15:
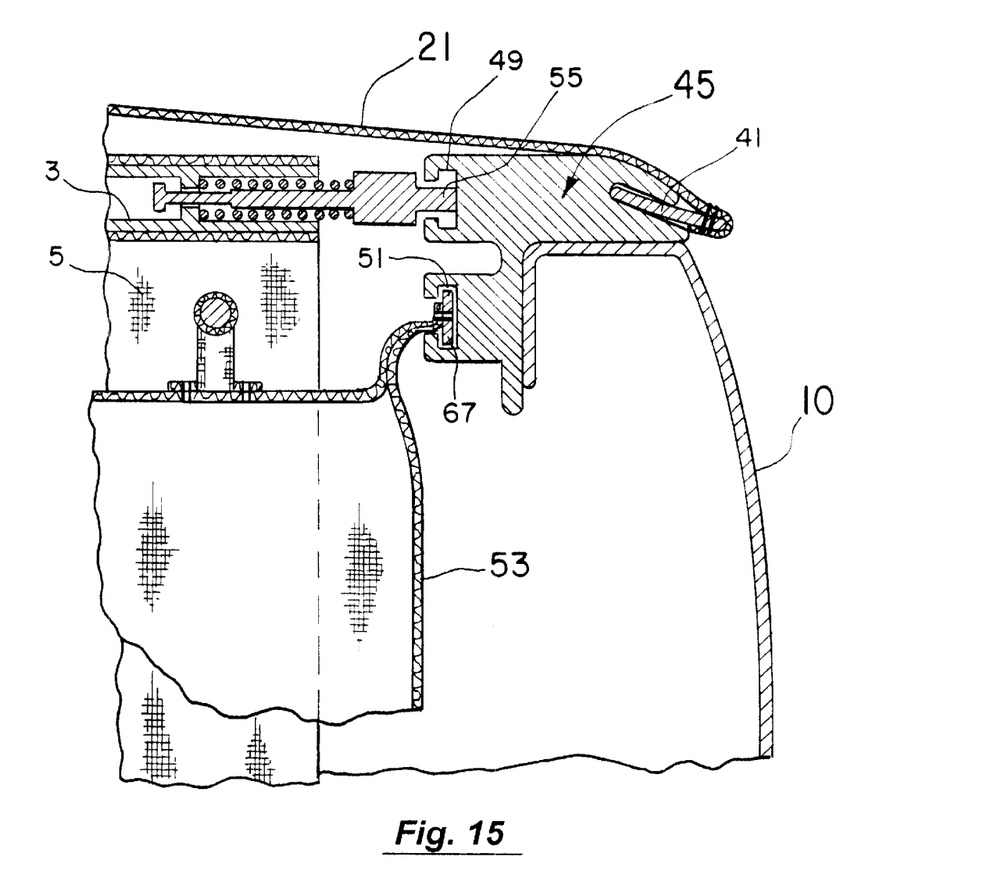

As also illustrated in FIG. 15, the side rails 45 preferably have channels or tracks 49 and 51 to respectively receive the bow 3 of the storage compartment 1 as well as accessories such as the carrying bag 53 in FIGS. 3 and 15. More specifically, each tip of the bow 3 has a spring-biased member 55. In use, each end member 55 is inserted at the desired location into the channel 49 in each side rail 45. Alternatively, each end member 55 can be inserted anywhere along the channel 49 and then slid in the channel 49 to the desired location between front and rear rails 33 and 39. If desired, the channel 49 could have vertically open notches therealong to aid in receiving the end members 55 more easily into the channels 49. The bows 18 supporting the tonneau cover 21 in FIG. 1 are also supported in the channels 49 in essentially the same manner. However, the lengths of the bows 18 are slightly greater so the bows 18 will arch between the side walls 10 to support the tonneau cover 21 as shown.

Figure 17:
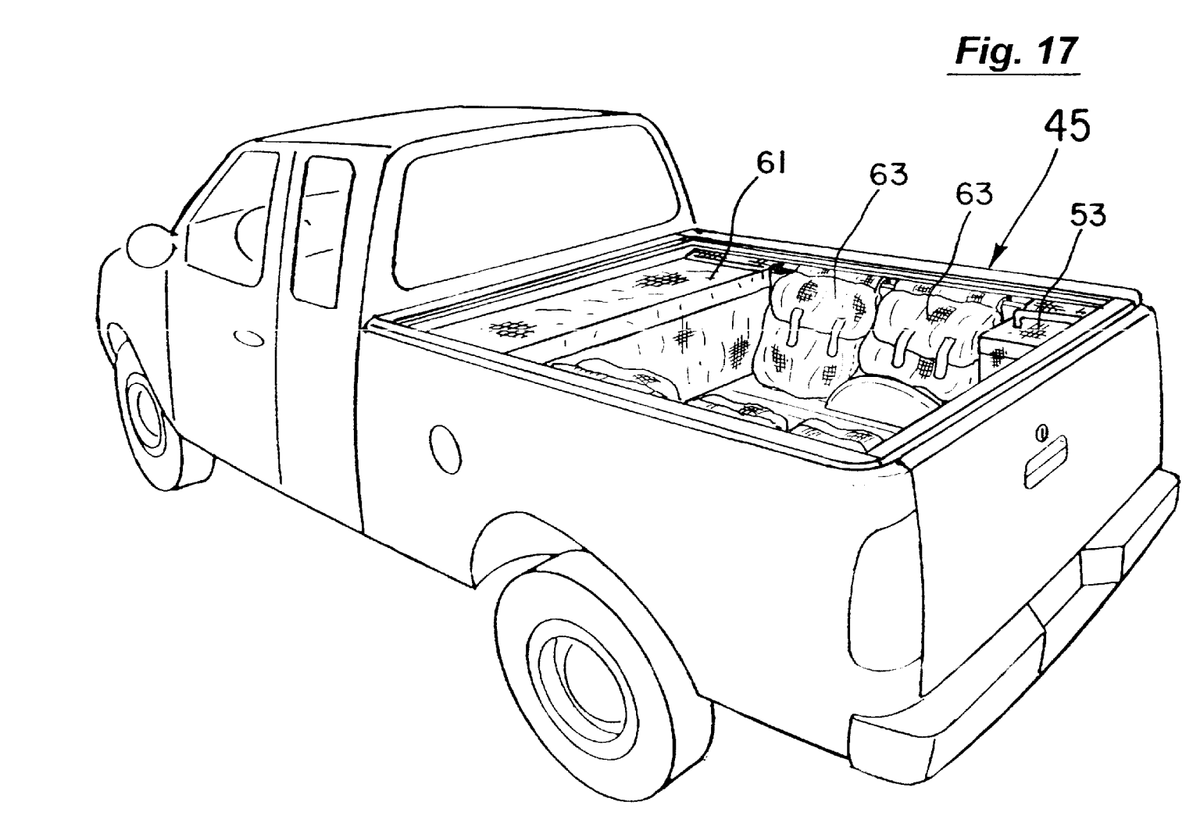
FIG. 17 illustrates an array of containers positioned in the box of the vehicle using the channels or tracks of the storage system of FIG. 15.
Figure 18:
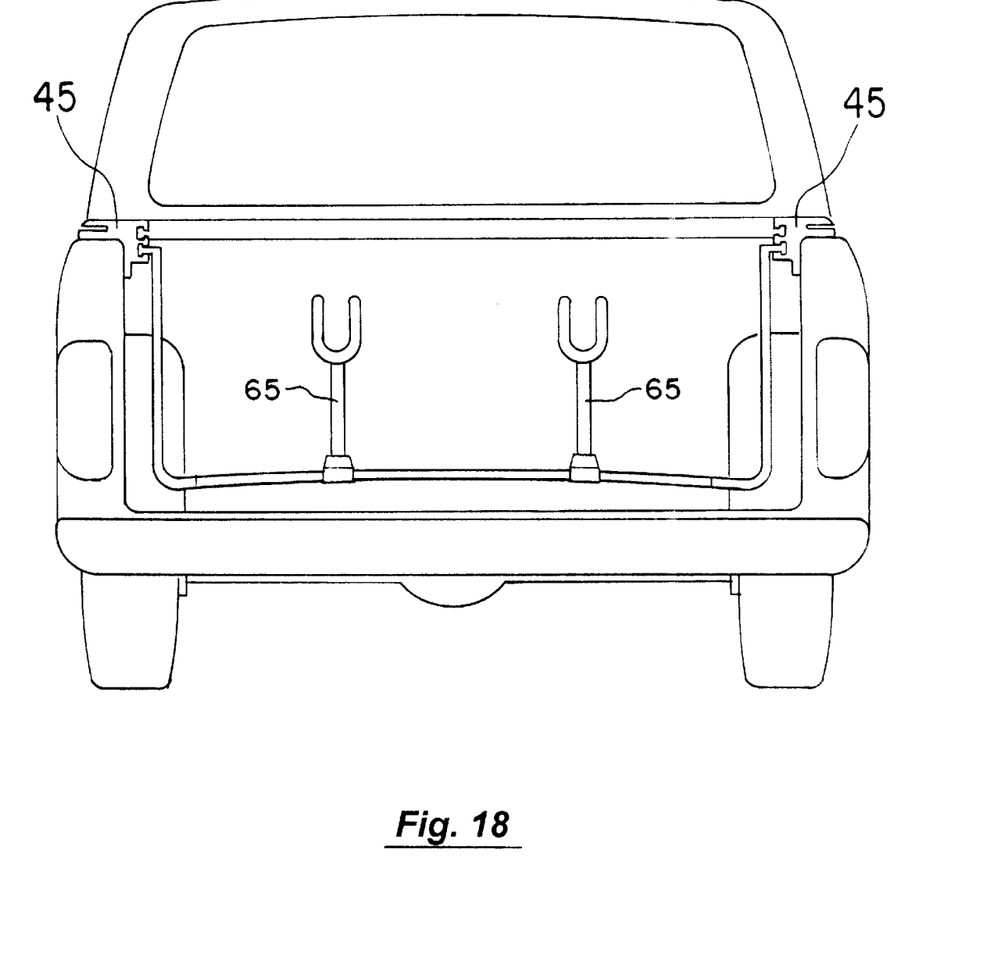
FIG. 18 is a view of the storage system of FIG. 15 adapted to support a bicycle rack in the channels or tracks.

A feature of the present invention is this use of the channels 49 and 51 in the side rails 45 to receive and secure items such as the carrying bag 53 of FIG. 15, the array of other storage containers and accessories 61 and 63 of FIG. 17, and the bicycle racks 65 of FIG. 18. With this channeled feature, an entire system of specialized and generic storage containers and accessories can be selectively positioned in an easy and convenient manner along the side walls 10 and across the box 2 of the vehicle 4. This can all be done while still enabling the tonneau cover 21 to be used to selectively and independently cover the box 2. Further, the channels 49 and 51 can be used in this manner in conjunction with or separately from the storage compartment 1 of the other embodiments.

This channeled storage feature can be used as shown in FIG. 17 to hold large, flexible containers such as 61 that extend completely across the box 2. However, this feature is particularly useful to store and secure smaller containers (and their contents) such as 53 and 63 in FIG. 17. That is, such smaller containers 53 and 63 could be transported in the cabin of the vehicle 4 but this takes up valuable passenger space. Rigid tool or storage boxes can be provided in and across the box 2 (typically directly behind the cabin) for such smaller containers 53 and 63. However, such tool boxes are fairly difficult to access from the sides of the vehicle 4, take up storage space if not completely filled, and are not easily removable if it is desired to use the full area of the vehicle bed 16.

Figure 16:
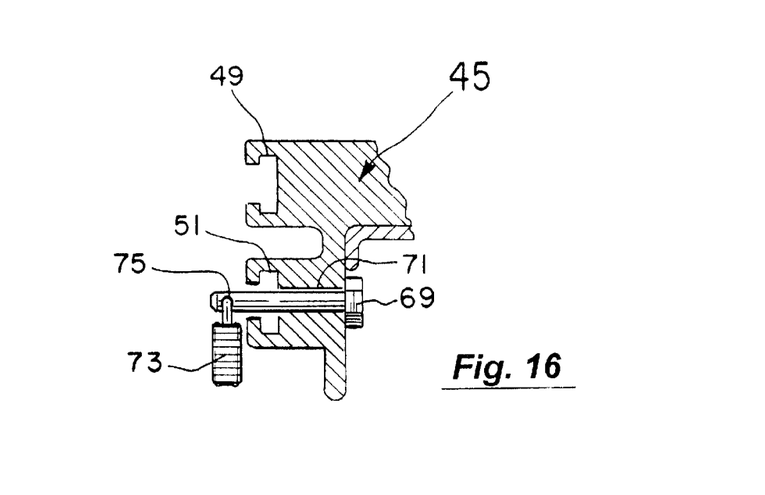
FIG. 16 illustrates a locking arrangement for the lower channel of FIG. 15.

In this light and to use the tracks or channels 49 and 51 for this purpose, the storage containers such as 53 in FIG. 15 and 61 and 63 in FIG. 17 can be provided with tabs 67 (see FIG. 15) of relatively rigid material. The tabs or belts 67 are sewn or otherwise attached to the containers 53, 61, and 63. The tabs 67 as shown are slidably receivable in the channel 51 (or channel 49). Preferably, at least the channel 51 is open ended adjacent the tailgate 6 wherein the tab 67 in FIG. 15, for example, can be slid into the channel 51 from the open rear end and then slid forward in the channel 51 to the desired location. Once in place, a locking arrangement including a pin 69 as illustrated in FIG. 16 can be inserted adjacent the open end of the channel 51 through the hole 71 in the channel 51. The pin 69 can be secured in place by a lock 73 inserted through the opening 75 in the pin shaft. Alternatively, the lock 73 could be designed to simply be inserted through the hole 71 eliminating the need for the pin 69. The carrying bag 53 or other containers 61 and 63 then cannot be slid rearwardly out of the channel 51 without unlocking the lock 73. Whether or not a lock such as 73 is used, the tailgate 6 in the preferred embodiments is lockable at 77 in FIG. 1 and in the closed position, the tailgate 6 abuts or nearly abuts the open end of the channel 51. Consequently, with the tailgate 6 closed, the tabs 67 of the containers 53, 61, and 63 cannot be slid rearwardly out of the channel 51 (or 49) without first unlocking and opening the tailgate 6. Further, if the containers 53, 61, and 63 themselves are also provided with locks (e.g., lockable zippers), an additional level of security against theft can be presented.

The channels or tracks 49 and 51 are preferably integrated directly into the retainer rails 45 (e.g., extruded aluminum or molded plastic) for the tonneau cover 21 but could be separate if desired. The tab/channel arrangement could also be reversed with the tab on the rail 45 and the channel on the storage container 53, 61, or 63. Other arrangements could also be used. As also mentioned above, the storage containers could be generic in function or specialized for individual needs such as construction, recreation, sports, hunting, fishing, or emergency road hazards. For example, the containers could be designed to specifically carry guns or fishing rods. The containers are preferably made of soft or flexible material so as to be easily foldable when not in use but could be made of rigid or semi-rigid material if desired. The rails 45 of the present invention as indicated above can also be used if desired to support or suspend rigid or foldable racks such as 65 in FIG. 18 for bicycles, skis, luggage and the like. The tonneau cover 21 is preferably a soft one (e.g., fabric, canvas, or vinyl) but could be hard (e.g., fiberglass) if desired.

While several embodiments of the present invention have been shown and described in detail, it to be understood that various changes and modifications could be made without departing from the scope of the invention.

We claim:

1. A storage system integrated into a soft tonneau cover for a vehicle, said vehicle having a bed, tailgate, and at least two, spaced-apart side walls extending upwardly from said bed, said tailgate being pivotally mounted for movement about an axis between open and closed positions, said soft tonneau cover being made of flexible, foldable material and being positionable to extend between the side walls of the vehicle over the bed thereof, said soft tonneau cover including a storage compartment having at least first and second panels, said first panel being attached to said tonneau cover and depending substantially vertically downwardly form said tonneau cover to a first location adjacent the bed of the vehicle, said first location being forward of the tailgate in the closed position, said second panel of said storage compartment being attached to said first panel and extending rearwardly therefrom and over said bed toward said tailgate wherein items to be stored can be placed on said second panel between said first panel and said tailgate.

2. The storage system of claim 1 wherein said storage compartment further includes at least one divider section attached to said first panel at a location between said side walls of the vehicle and extending rearwardly from said first panel toward the tailgate, said divider section forming at least two subcompartments on each side thereof wherein items to be stored can be respectively placed on the second panel in each subcompartment between said first panel and said tailgate.

3. The storage system of claim 2 wherein said divider section is removably attached to said rear panel adjacent said tailgate in a first position to form said subcompartments and can be moved to a second position substantially flush against said first panel.

4. The storage system of claim 3 wherein said divider section has a substantially triangular shape.

5. The storage system of claim 1 further including at least one strip of material attached to said second panel and extending rearwardly therefrom, said strip being positionable between said tailgate and the bed of said vehicle to be pinched therebetween when said tailgate is in said closed position to aid in anchoring the panels of said storage compartment in place.

6. The storage system of claim 1 wherein said tailgate in said open position provides rear access to said storage compartment through a tailgate opening extending between said side walls.

7. The storage system of claim 1 wherein said panels of said storage compartment can be folded up to a position adjacent said tonneau cover.

8. The storage system of claim 1 further including at least one rail on at least one of said side walls having a channel extending therealong, a storage container, and means for removably securing said storage container in said channel to said rail.

9. The storage system of claim 8 wherein said storage container includes a tab attached thereto and slidably receivable in said channel.

10. The storage system of claim 8 further including means for selectively locking said secured storage container in said channel.

11. The storage system of claim 10 wherein said locking means includes a locking arrangement receivable in said channel.

12. The storage system of claim 10 wherein said locking means includes said tailgate.

* * * * *